United States Patent
Rosenberg et al.

(10) Patent No.: US 10,965,725 B1
(45) Date of Patent: Mar. 30, 2021

(54) CONFERENCE SESSION ACCESS USING REACHABILITY INFORMATION FOR DISTRIBUTED CLUSTERS OF MEDIA NODES

(71) Applicant: Cisco Technology, Inc., San Jose, CA (US)

(72) Inventors: Jonathan Rosenberg, Freehold, NJ (US); Carl Nathan Buckles, McKinney, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 639 days.

(21) Appl. No.: 15/647,949

(22) Filed: Jul. 12, 2017

(51) Int. Cl.
| | |
|---|---|
| *H04L 29/06* | (2006.01) |
| *H04L 12/18* | (2006.01) |
| *H04N 7/14* | (2006.01) |
| *H04N 7/15* | (2006.01) |

(52) U.S. Cl.
CPC ...... *H04L 65/4038* (2013.01); *H04L 12/1822* (2013.01); *H04L 12/1827* (2013.01); *H04L 65/1069* (2013.01); *H04N 7/148* (2013.01); *H04N 7/15* (2013.01)

(58) Field of Classification Search
CPC ............ H04L 65/4038; H04L 12/1822; H04L 65/1069; H04L 12/1827; H04L 67/1065; H04N 7/148; H04N 7/15
See application file for complete search history.

(56) References Cited

U.S. PATENT DOCUMENTS

| | | | |
|---|---|---|---|
| 7,983,660 B2 | 7/2011 | Bao et al. | |
| 8,208,477 B1* | 6/2012 | Xiong | H04L 67/1065 |
| | | | 370/400 |
| 8,265,614 B2 | 9/2012 | Allen et al. | |
| 8,589,563 B2 | 11/2013 | Ethier et al. | |

(Continued)

OTHER PUBLICATIONS

"How does the Begin Test button select a server?", Jan. 11, 2012, https://support.speedtest.net/hc/en-us/articles/203845410-How-does-the . . . , 3 pages.

(Continued)

*Primary Examiner* — June Y Sison
(74) *Attorney, Agent, or Firm* — Edell, Shapiro & Finnan, LLC

(57) ABSTRACT

A conference system includes a controller and clusters of media nodes. Each media node performs media packet processing operations and connects with other media nodes and client devices. The controller sends to a client device contact information for candidate clusters. The controller receives from the client device a measure of reachability to each candidate cluster as determined by the client device using the contact information. The controller receives from the client device a request to join a communication session. Responsive to the request, the controller determines a best cluster among the candidate clusters to which the client should connect for the communication session based on the measures of reachability to the candidate clusters, and selects a media node in the best cluster. The controller sends to the client device contact information for the media node to enable the client device to connect to the media node for the communication session.

19 Claims, 13 Drawing Sheets

(56) References Cited

U.S. PATENT DOCUMENTS

| | | | |
|---|---|---|---|
| 8,694,587 | B2 | 4/2014 | Chaturvedi et al. |
| 8,892,646 | B2 | 11/2014 | Chaturvedi et al. |
| 9,357,076 | B2 | 5/2016 | Rosenberg |
| 9,614,687 | B2 | 4/2017 | Rosenberg |
| 2008/0219223 | A1 | 9/2008 | Bienas et al. |
| 2010/0165889 | A1 | 7/2010 | Madabhushi et al. |
| 2011/0149810 | A1* | 6/2011 | Koren ................. H04L 12/1827 370/261 |
| 2013/0196637 | A1 | 8/2013 | Allen et al. |
| 2013/0329865 | A1 | 12/2013 | Ristock et al. |
| 2013/0339781 | A1 | 12/2013 | Wamorkar et al. |
| 2014/0280595 | A1 | 9/2014 | Mani et al. |
| 2014/0304399 | A1* | 10/2014 | Chaudhary ......... H04L 41/5009 709/224 |
| 2015/0058469 | A1 | 2/2015 | Li et al. |
| 2015/0249547 | A1 | 9/2015 | Layman et al. |
| 2015/0358171 | A1 | 12/2015 | Rosenberg |
| 2015/0358472 | A1 | 12/2015 | Rosenberg |
| 2016/0286165 | A1 | 9/2016 | Sorokin et al. |
| 2016/0309037 | A1 | 10/2016 | Rosenberg et al. |

OTHER PUBLICATIONS

"Hybrid Media Clusters", Cisco Documentation Team, Jan. 3, 2017, Cisco Cloud Collaboration Central, https://help.webex.com/docs/DOC-14481, 10 pages.

* cited by examiner

CONFERENCE SESSION ACCESS USING REACHABILITY INFORMATION FOR DISTRIBUTED CLUSTERS OF MEDIA NODES

TECHNICAL FIELD

The present disclosure relates to conference sessions in cloud-based conference systems.

BACKGROUND

Software-as-a-Service (SaaS) cloud-based conference services enable business-to-business and business-to-consumer conferencing but can incur relatively high wide area network costs, latency penalties, and possible quality degradation. When building a conferencing service for SaaS delivery, it is advantageous to deploy media nodes, which perform audio and video switching, mixing, transcoding and other related real-time operations, across a multiplicity of geographies. This allows users to connect to closer media nodes to reduce latency. However, as the number of geographies scales up to dozens and even hundreds, challenges arise in how users should discover which media node to connect to for a conference session.

DESCRIPTION OF EXAMPLE EMBODIMENTS

Overview

A conference system includes a controller and geographically distributed clusters of media nodes, wherein each media node is configured to perform media packet processing operations and to connect with other media nodes and client devices to form media pathways over which media packets are exchanged in communication sessions between the client devices. The controller sends to a client device contact information for candidate clusters that are potentially usable by the client device for establishing a communication session, and receives from the client device a respective measure of reachability to each candidate cluster as determined by the client device using the contact information. The controller receives from the client device a request to join a communication session. Responsive to the request, the controller determines a best cluster among the candidate clusters to which the client should connect for the communication session based on the measures of reachability to the candidate clusters, and selects a media node in the best cluster. The controller sends to the client device contact information for the selected media node to enable the client device to connect to the selected media node for the communication session.

EXAMPLE EMBODIMENTS

Conventional SaaS conference services are unable to meet many of the following requirements, and unable to meet them simultaneously: users should ideally be connected to the same media node in order to reduce the need for cascade links; users should connect to media nodes with low latency, e.g., having low round-trip-times (RTTs) to the users; users should connect to media nodes that are available, i.e., have enough compute/bandwidth capacity remaining to handle an active conference session; the SaaS conference service and supporting system should linearly scale so that more media nodes and clusters of media nodes can be easily added; the time required to join a conference session should be fast; the SaaS conference service and supporting system should be adaptive so that, as a user moves around (for example, on a mobile phone which moves from one communication protocol to another), the point of connectivity can adjust.

Cloud-Based Conference System

Figure 1:
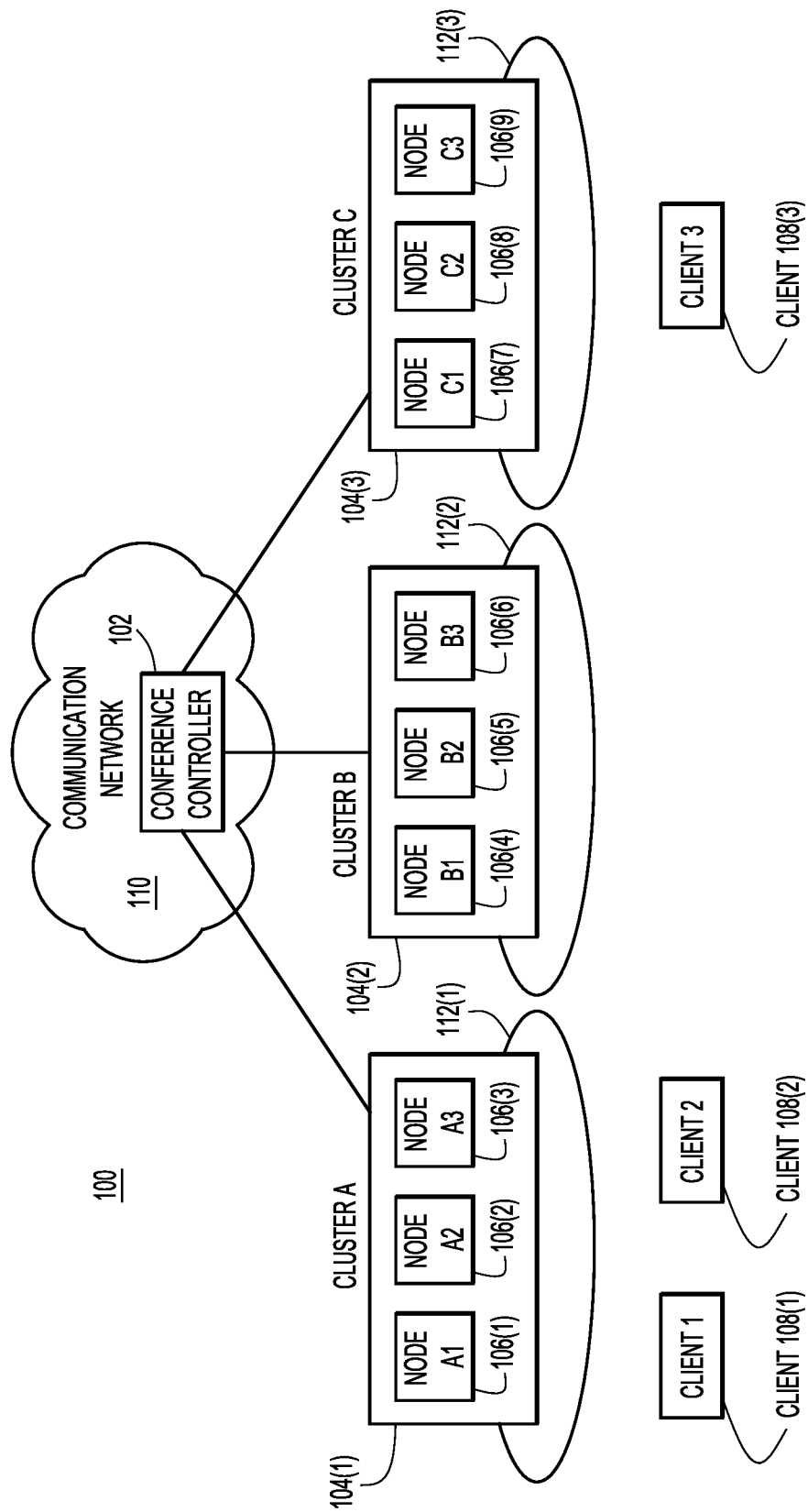
FIG. 1 is an illustration of a highly-distributed cloud-based conference system in which conference session access using reachability information for clusters of media nodes may be implemented, according to an example embodiment.

Referring to FIG. 1, there is an illustration of a highly-distributed cloud-based conference system 100 in which conference session access using reachability information for clusters of media nodes may be implemented. This system can be referred to as a hybrid system that provides a mix of cloud-based features and on-premise based features which the short-comings of either solution in isolation. Conference system 100 includes a central conference controller 102 located in a "cloud" and configured to perform overall control of system 100. Conference system 100 includes multiple geographically distributed groups or clusters 104(1), 104(2), and 104(3) of media nodes 106(1)-106(3), 106(4)-106(6), and 106(7)-106(9), respectively, configured to operate under control of controller 102. Multiple client devices 108(1)-108(3) access and participate in conference sessions (also referred to as "conference calls" and "communication sessions") through media nodes 106(1)-106(9) under control of the controller 102. In general, communication sessions include audio and video calls between client devices 108(1)-108(3), as well as web-based or online meetings conducted over the Internet and managed by a meeting server (not shown in FIG. 1) that presents web-pages to each client device that is connected to the same meeting to mimic a collaborative environment in which users of the client devices can converse in audio, video and electronically share documents and other data in real-time.

In the ensuing description, media nodes 106(1)-106(9) are referred to collectively as "media nodes 106" and individually as a "media node 106," clients 108(1)-108(3) are referred to collectively as "clients 108" and individually as a "client 108," and clusters 104(1)-104(3) are referred to collectively as "clusters 104" or individually as a "cluster 104." An alternative nomenclature depicted in FIG. 1 refers to: clusters 104(1)-104(3) as clusters A-C; media nodes 106(1)-106(3), 106(4)-106(6), and 106(7)-106(9) as media nodes A1-A3, B1-B3, and C1-C3, respectively; and clients 108(1)-108(3) as clients1-clients3.

Conference controller 102 resides in a "cloud" or data center 110. To control system 100, conference controller 102 performs control plane signal operations/functions using such features/functions afforded by the Session Initiation Protocol (SIP), H323 access, rosters, and conference control operations (including, e.g., mute, kick, etc.). Conference controller 102 also performs orchestration—which means it is responsible for controlling the connections between media nodes in different clusters to ensure that a particular conference is fully connected and provides the necessary audio and video processing functions. Clusters 104 of media nodes 106 each reside in a respective cloud or data center shown at reference numerals 112(1)-112(3), which may include enterprise networks, branch networks and offices, carrier access networks, public clouds, and so on. Media nodes 106 perform media (e.g., audio and video and screen share) packet processing operations in support of communication sessions in which clients 108 participate, such as, but not limited to, media packet mixing, switching, encoding, decoding, and transcoding. A communication session may involve the exchange of one or more of audio and video between any number of participants (clients) as well as the sharing of content by one participant with one or more other participants. Such shared content may include documents, presentations, audio content, video content, etc.

Techniques presented herein dynamically configure highly-distributed resources in conference system 100, including controller 102 and media nodes 106, to support communication sessions initiated by clients 108 on an as needed basis. In support of these techniques, controller 102, media nodes 106, and clients 108 implement and interact with each other using a variety of communication protocols to establish communication sessions and exchange media streams/packets in the communication sessions. Such communication protocols include, but are not limited to: the Hypertext Transfer Protocol (HTTP), the Interactive Connectivity Establishment (ICE) protocol; the Session Traversal Utilities for Network Address Translation/Translator (NAT) (STUN) protocol; the User Datagram Protocol (UDP); the Real-Time Transport Protocol (RTP), and the Session Description Protocol (SDP). The techniques use the aforementioned protocols by way of example, only; other similar protocols may also be used instead of or in combination with the mentioned protocols, as would be appreciated by one of ordinary skill in the relevant arts having access to the description presented herein.

Distributed media nodes 106 may number in the tens of thousands and be distributed geographically around the world. Similarly, clients 108 may be located anywhere in the world. Thus, conference system 100 is referred to as "highly distributed." Techniques presented herein assign "best" clusters, and media nodes within the best clusters, to clients in highly distributed conference system 100 in support of media exchange between clients in communication sessions in such a way as to satisfy the following criteria, simultaneously: (i) clients are ideally assigned/connected to the same media node in order to reduce the need for cascade links; (ii) clients are ideally assigned/connected to media nodes that are available, i.e., operationally capable of performing media node operations; (iii) clients are ideally assigned to media nodes able to form connections with the clients relatively quickly, i.e., with relatively low latency (e.g., the media nodes have relatively low RTTs to the clients), (iv) clients are assigned to media nodes having available compute, network, and memory capacity to handle the communication session, and (v) clients are assigned to media nodes which are permitted to be used by that user based on policy.

At a high-level, conference controller 102 controls access by clients 108 to a communication session using reachability information to clusters 104. Controller 102 initially sends to each of clients 108 respective contact information for respective candidate clusters among clusters 104 that are potentially usable by each client for establishing a communication session. Each of clients 108 communicates with its respective candidate clusters using the respective contact information to determine respective reachability information to the candidate clusters. The reachability information includes a respective measure of reachability, e.g., a RTT, path hop count, available bandwidth, measured loss, etc. to each of the respective candidate clusters, as well as indications of whether media nodes in the candidate clusters are unavailable. Clients among clients 108 intending to initiate/join a communication session send to controller 102 respective join requests. The clients also send to controller 102 their determined reachability information, either with the join requests, or prior to sending the join requests. Responsive to the join requests and the respective reachability information, controller 102 determines for each of the clients a respective best media node within a selected cluster among the respective candidate clusters to which the client should connect for the communication session based on the reachability information, taking into consideration which media nodes are already being utilized for the conference, and selects a respective media node in the best cluster. Controller 102 sends to the clients respective contact information for the respective best clusters/media nodes for the communication session, and informs the respective media nodes of the clients joining the communication session that the media nodes have been selected for the communication session.

The clients connect to the respective media nodes using the contact information (initiated by the join requests) from controller 102, and the media nodes connect to each other as necessary under control of controller 102, to establish a media pathway between the clients for the communication session.

Before describing the above-mentioned high-level transactions in detail, the following definitions are provided for various components and protocols mentioned above.

Media node: A media node (e.g., any of the media nodes 106) performs media processing functions under control of conference controller 102, such as switching, mixing, transcoding, presentation layout arranging, recording, interactive voice response, voice and video analytics and machine learning, and the like. A media node is configured to form a pipeline which defines a set of internal media processing functions that are applied. These include buffering, decoding, mixing, switching, energy level computation, and so on. The media node can also be configured to form a cascade. A cascade is a connection between two media nodes which carries media between them to extend a conference across multiple media nodes. Conference controller 102 instructs each media node as to how to assemble the media pipeline and to which other media nodes it should form cascades. Conference Controller: Conference controller 102 provides overall control of initializing and configuring resources, such as media nodes 106, to support a conference/communication session. Conference controller 102 exposes Internet/web Application Programming Interfaces (APIs) to clients 108 and media nodes 106, which permit remote applications to request creation and manipulation of communication sessions. A communication session is a related set of conference media streams which are logically connected together with a media pipeline and cascades, i.e., media packets associated with each of the media streams are mixed together and routed through the pipeline by the media nodes connected with the pipeline. Conference controller 102 determines the composition of the media pipeline and cascades across media nodes which will support the communication session. Conference controller 102 is aware of 104 clusters and media agents 106 within the clusters via an a priori registration process in which contact information and identifiers for each of the clusters, and each of the media agents within each cluster, is provided to and stored by the conference controller. In addition, conference controller 102 is aware of which of clients 108 are authorized to use which media nodes 106 in clusters 104. Such authorization may also be provided during registrations of clients 106 (e.g., their users) in various user databases accessible to conference controller 102. Though shown as a single server instance for ease of understanding, conference controller 102 is typically implemented as a cluster of servers with access to a shared database.

STUN: (Session Traversal Utilities for NAT) is a standardized set of methods and a network protocol to enable an endpoint host to discover an associated public IP address of the host if the host is located behind a Network Address Translation/Translator (NAT). STUN permits NAT traversal for applications of real-time media, including voice, video, messaging, and other interactive IP communications. STUN is intended as a tool used in other protocols, such as Interactive Connectivity Establishment (ICE). STUN is documented in RFCs 5389 and 7046. In embodiments presented herein, STUN is also used as a technique for measuring round trip times and reachability to a cluster.

ICE: ICE is a technique used in computer networking involving NATs in Internet applications of Voice-over-IP (VoIP), peer-to-peer communications, video, instant messaging and other interactive media. ICE is published in RFC 5245.

Generalized Device Controller

Figure 2:
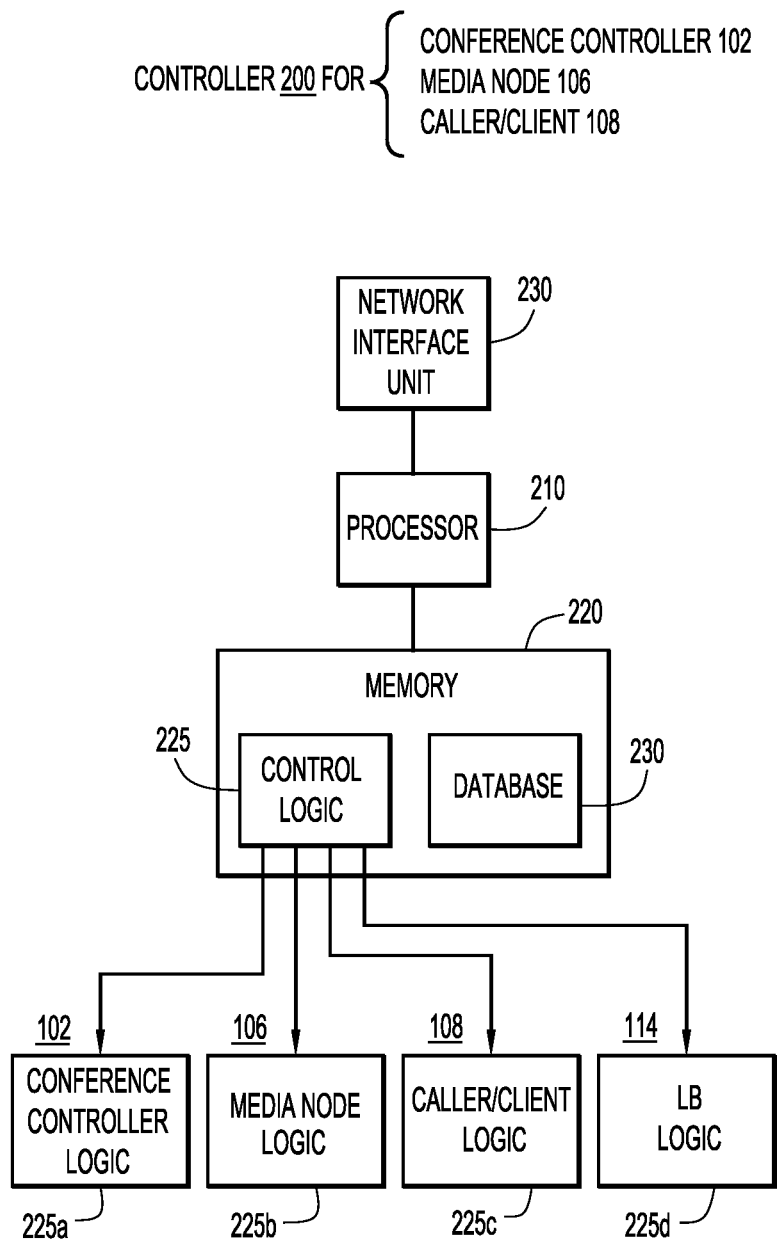
FIG. 2. is a block diagram of a generalized controller that may be used in any of a central conference controller, a media node, and a client device of the conference system.

With reference to FIG. 2, there is depicted a block diagram of an example generalized controller 200 for any of conference controller 102, media node 106, and client108. Conference controller 102 and media node 106 may each comprise one or more computer servers controlled by an instance of generalized controller 200. Client108 may be a client device such as, but not limited to, a Smartphone, a tablet, a laptop/personal computer, and the like, controlled by an instance of generalized controller 200.

Generalized controller 200 includes a processor 210 that processes instructions to perform operations for a respective one of conference controller 102, media node 106, and client108; and a memory 220 to store a variety of data and software instructions for execution by the processor 210. Generalized controller 200 also includes a network interface unit (e.g., network interface card or multiple network interface cards) 230 that enables network communications so that the generalized controller can communicate with other devices, as explained in further detail hereinafter. Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software (e.g., control logic/software 225) comprising computer executable instructions and when the software is executed (by the processor 210) it is operable to perform the operations described herein. In addition, memory 220 includes a data store or database 230 to store data used and generated by logic 225. Instances of memory 220 residing in conference controller 102, media node 106, and client108, respectively includes, conference controller logic 225a, media node logic 225b, client logic 225c, and load balancing logic 225d (which may be incorporated into logic 225a and logic 225b) to assist with load balancing across media nodes in a given cluster) to perform the operations for the respective device as described below."

Cluster Reachability Information

Figure 3:
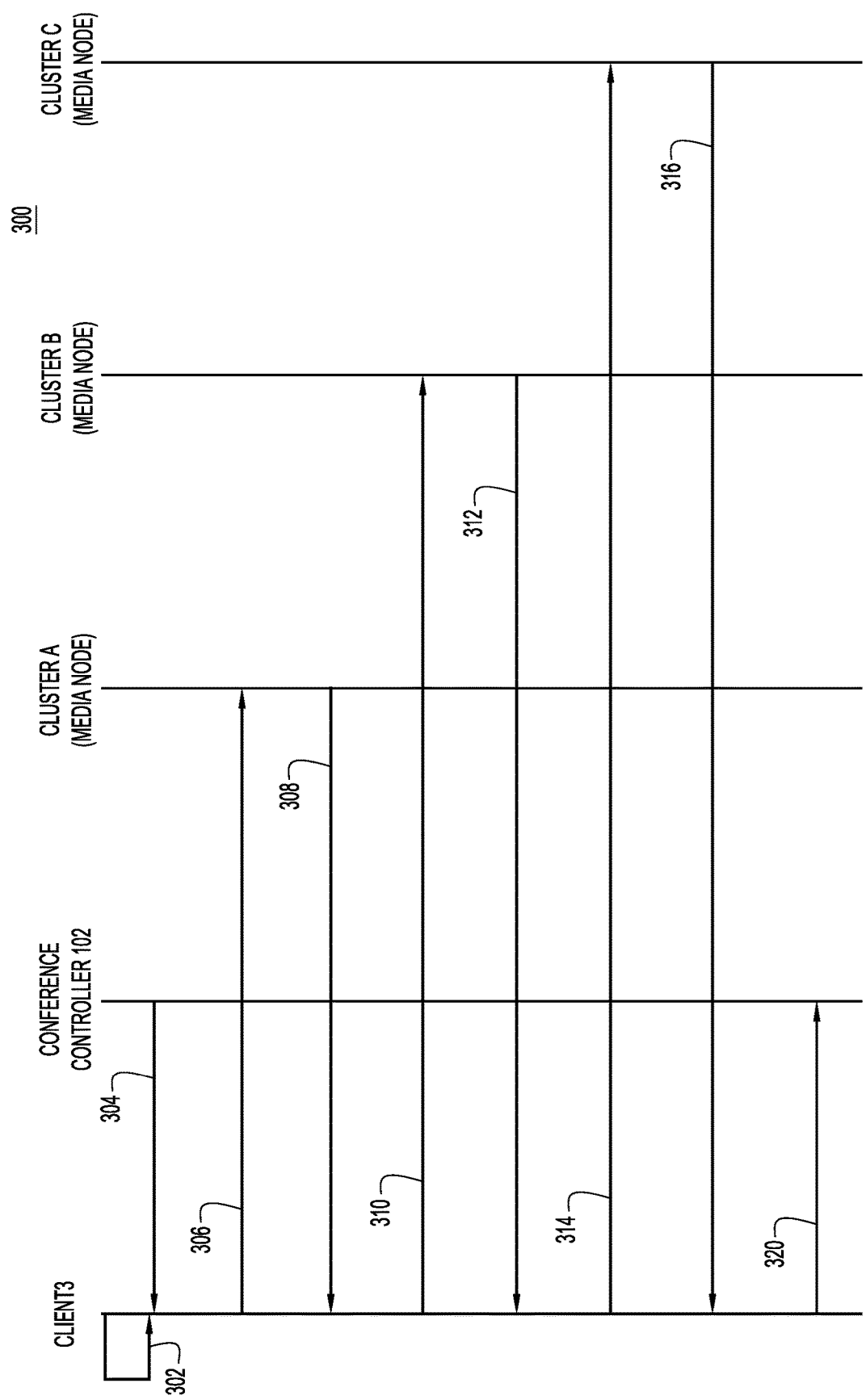
FIG. 3 is a transaction diagram for generating cluster reachability information from a client device to candidate clusters of media nodes in the conference system, prior to when the client device initiates or joins a communication session, according to an example embodiment.

With reference to FIG. 3, there is depicted an example transaction diagram 300 for generating cluster reachability information from client3 to candidate clusters A-C, prior to a communication session. Transaction diagram 300 depicts both message transactions between and operations performed by various components in system 100. The reachability information includes (i) measures of reachability from client3 to each of candidate clusters A-C (e.g., a respective RTT to each cluster), (ii) media node availability, e.g., indications of whether certain media nodes in each of the candidate cluster are unavailable to/unreachable by client3, and (iii) candidate cluster availability, e.g., indications of whether any of the candidate clusters, as a whole, is unavailable to/unreachable by the client. A similar process is used to generate reachability information for each of clients 1083 (i.e., "client1," "client2," and "client3") relative to their own/respective candidate clusters. In addition, reachability information may include other metrics such as available bandwidth, packet loss, jitter, and network hop count.

At 302, client3 initiates a trigger event. Trigger events include, but are not limited to, client3 connecting to network 110, or an IP address of the client device changing. At 304, which is at the time a client first connects to the network, conference controller 102 determines candidate clusters for client3 based on policy information. The policy information can be based on any number of factors, including an organization or company to which a user of client3 belongs, which enables clusters to be dedicated in whole or in part to specific organizations. The candidate clusters for client3 may also be predetermined. Identifiers of/contact information for the candidate clusters and their respective media nodes are stored in conference controller 102 or are otherwise accessible to the conference controller. The contact information may include, but is not limited to, IP addresses and ports through which the media nodes may be accessed. In the example of FIG. 3, conference controller 102 determines that the candidate clusters for client3 include clusters A-C. Conference controller 102 sends to client3 a list of candidate clusters A-C. The list includes contact information for the candidate clusters A-C, including contact information for one or more media nodes in each of the candidate clusters. The contact information includes, IP addresses, ports, and communication protocol transport types, such as UDP and TCP. Client3 receives the list/contact information sent by conference controller 102.

Figure 4:
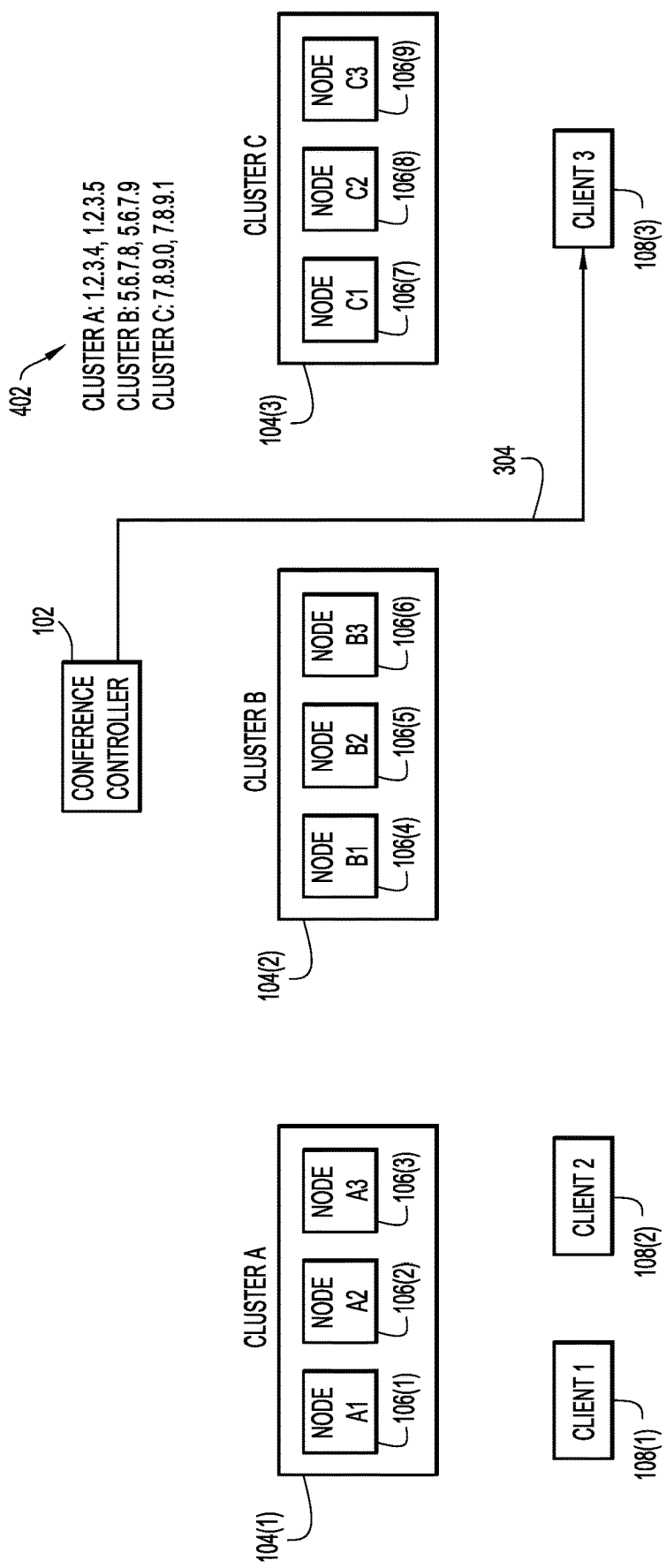
FIG. 4 is an illustration of an operation shown in FIG. 3 in which the conference controller sends to the client device contact information for media nodes in one of the candidate clusters, according to an example embodiment.

With reference to FIG. 4, there is an illustration of an example of operation 304 in system 100 in which conference controller 102 sends to client3 contact information 402 for two of the media nodes in clusters A-C. Contact information 402 includes, but is not limited to, IP addresses 1.2.3.4 and 1.2.3.5 for media nodes in cluster A, IP addresses 5.6.7.8 and 5.6.7.9 for media nodes in cluster B, and IP addresses 7.8.9.0 and 7.8.9.1 for media nodes in cluster C.

Returning to FIG. 3, upon receiving the contact information, i.e., a list of candidate clusters, from conference controller 102, client3 derives respective reachability information, including measures of reachability and availability, to each of the candidate clusters using the contact information, as described below at operations/transactions 306-316.

At 306, client3 sends a probe, e.g., a STUN bind request, to a media node in candidate cluster A, and starts a RTT timer upon sending the probe.

At 308, responsive to receiving the probe, the (probed) media node in candidate cluster A sends to client3 a probe response, e.g., a STUN bind response. In response to receiving the probe response, client3 stops the RTT timer, which records an RTT or latency to the responding media node in cluster A. This is referred to as a latency test performed by client3 and the RTT is an example of a measure of reachability to cluster A. It is assumed that the RTT to one of the media nodes in the candidate cluster is representative of RTTs to all of the media nodes in that candidate cluster. Thus, only one RTT for candidate cluster A is necessary, although multiple RTTs per cluster may be used. Client3 may determine other measures of reachability to the media node based on the exchange of the probe and the probe response, including an available communication bandwidth between the client and the media node, and/or a hop count traversed by the probe and the probe response.

For the latency test, client3 sends the probe to the probed media node such that the path taken by the probe mimics a media path that media transmitted by the client when connected to the media node would take during a communication session. In other words, transmission of the probe ideally matches transmission of the media during the communication sessions. To ensure the probe mimics the media, the probe uses the same IP port on client3, the same IP port on the probed media node, and the same transport type (e.g., UDP, TCP) as the media, for example. This is why STUN is utilized for the probe, since it is designed to be run on the same IP and port as the media.

If the (probed) media node fails to respond to the probe, client3 records the failure, and repeats the probe and probe response message exchange with the next media node in cluster A, to determine an RTT for the next media node. Client3 does this to deal with a possibility of an individual media node failure in the candidate cluster. Under some circumstances, client3 may not be able to reach any of the media nodes in cluster A. If that is the case, client3 records a candidate cluster failure.

Next operations/transactions 310 and 312 are substantially the same as operations/transactions 306 and 308, respectively, except that client3 exchanges a probe and a probe response with the media node(s) of candidate cluster B to derive a measure of reachability, e.g., an RTT, to candidate cluster B.

Next operations/transactions 314 and 316 are substantially the same as operations/transactions 306 and 308, respectively, except that client3 exchanges a probe and a probe response with the media node(s) of candidate cluster C to derive a measure of reachability, e.g., an RTT, to candidate cluster C.

Figure 5:
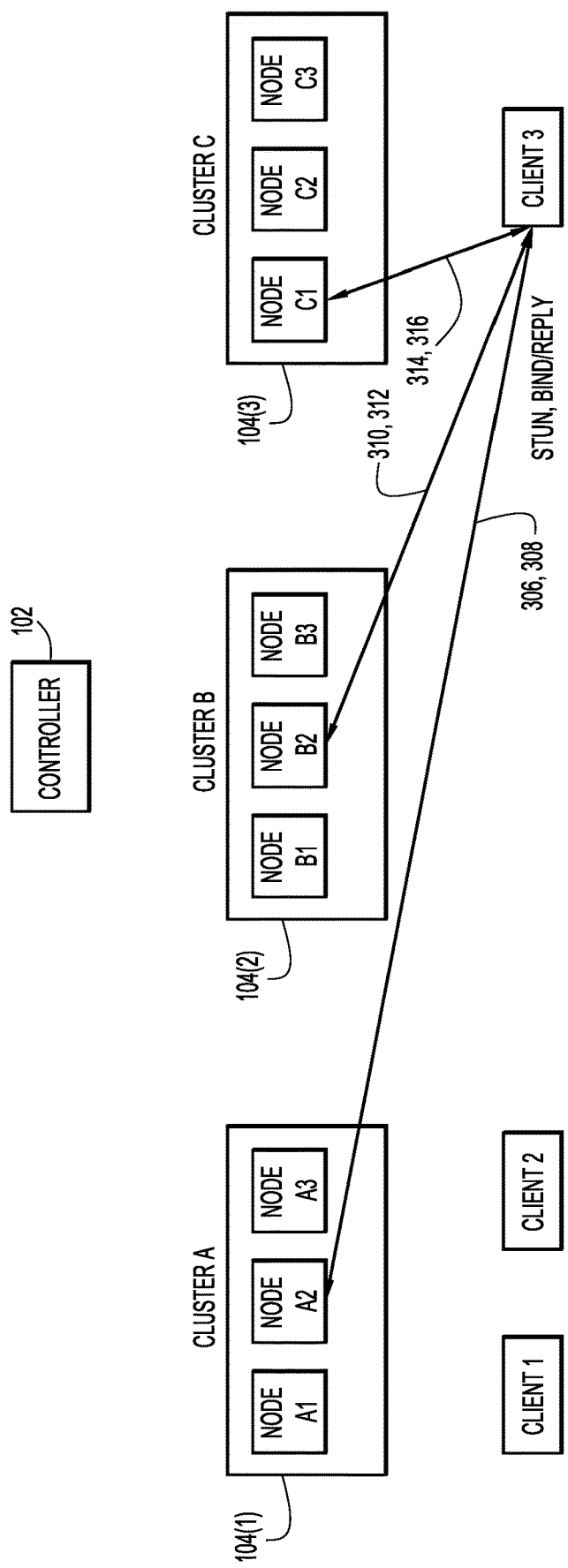
FIG. 5 is an illustration of further operations shown in FIG. 3 in which the client device exchanges probes and probe responses with media nodes in the candidate clusters, according to an example embodiment.

With reference to FIG. 5, there is an illustration of examples of operations/transactions (306, 308), (310, 312), and (314 and 316) in system 100 in which client3 exchanges probes and probe responses with media node A2 in cluster A, media node B2 in cluster B, and media node C1 in cluster C, respectively, using contact information 402.

Returning to FIG. 3, after completing operations/transactions 306-316, client3 possesses reachability information to/for candidate clusters A-C. The reachability information includes at least one measure of reachability (e.g., RTT, available communication bandwidth, hop count, and so on) to each of candidate clusters A-C, and may also include indications of unreachable/failed media nodes and/or clusters.

In one embodiment, at 320, client3 sends to conference controller 102 a reachability message including the reachability information prior to establishing or joining a communication session, and the conference controller receives the reachability message. In an alternative embodiment, client3 waits to send the reachability information to conference controller 102 along with a request to join a communication session, as described below.

Communication Session Setup

Figure 6:
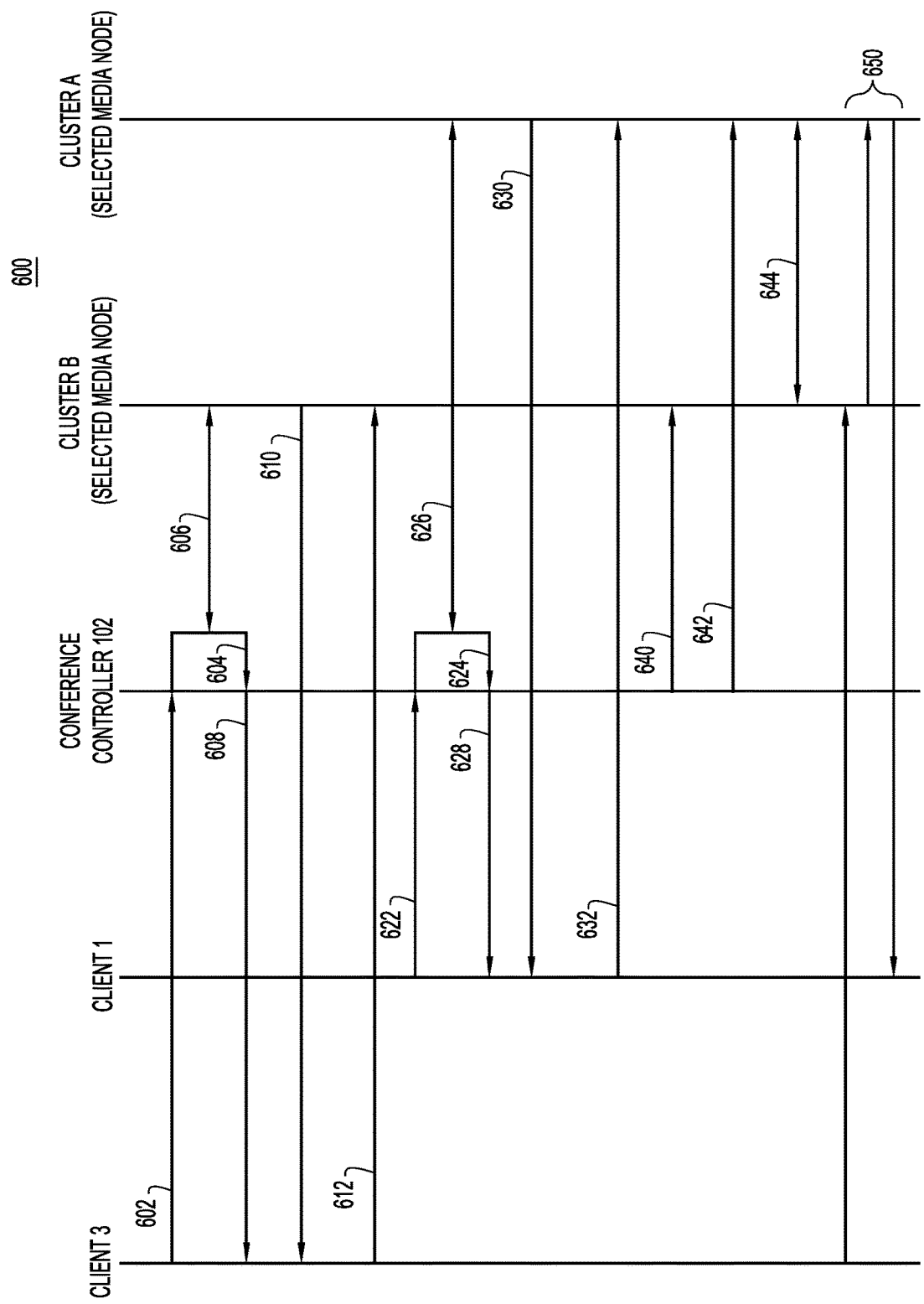
FIG. 6 is a transaction diagram in which clients establish a communication session with each other via cascaded media nodes in different clusters, according to an example embodiment.

With reference to FIG. 6, there is depicted an example transaction diagram 600 in which clients 1 and 3 establish a communication session with each other via cascaded media nodes in different clusters. The operations/transactions depicted in FIG. 6 occur after clients1-clients3 have derived respective reachability information to their respective candidate clusters, as described above in connection with FIGS. 3-5.

At 602-612, client3 (e.g., a first client) establishes and/or joins a communication session, as described in detail below.

At 602, client3 sends to conference controller 102 (and the conference controller receives) a request to join a communication session. The request is also referred to as a "join request," and may take the form of an SDP offer. The join request may include, for client3, an IP address, a port, codec capability, and an identifier associated with a user of the client (e.g., an email address, name, Universal Record Locator (URL), or other user identifier). The join request will also include an identifier for the conference to be joined. In one embodiment, conference controller 102 has previously received the reachability information to candidate clusters A-C for client3 derived by the client. Alternatively, the join request includes the reachability information for client 3.

Figure 7:
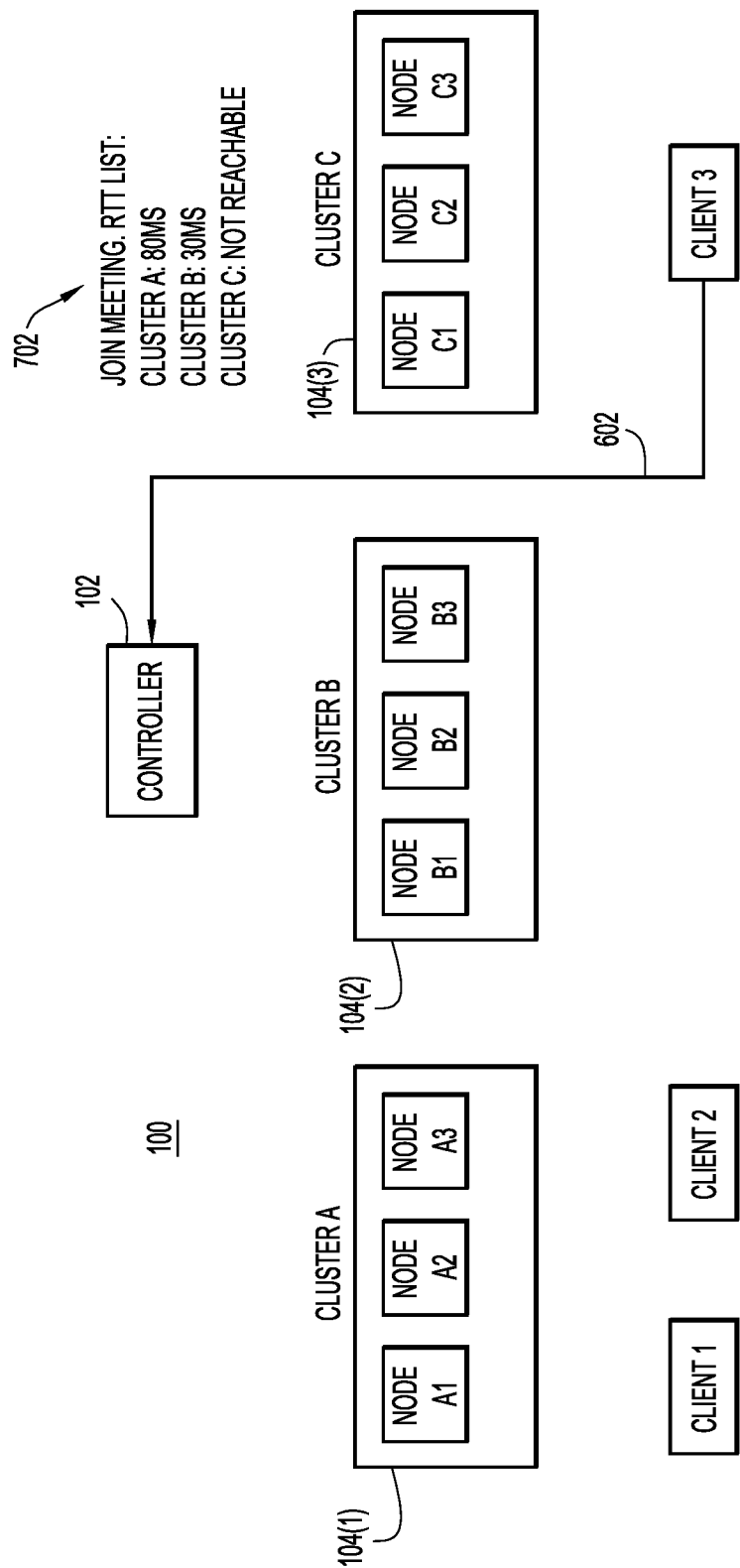
FIG. 7 is an illustration of an operation shown in FIG. 6 in which a client device sends to the conference controller a join request including reachability information for candidate clusters, according to an example embodiment.

With reference to FIG. 7, there an illustration of an example of operation 602 in system 100 in which client3 sends to conference controller 102 join request 602, including reachability information 702 to candidate clusters A, B, and C. The reachability information includes (i) latency information including an RTT to cluster A of 80 ms, an RTT to cluster B of 30 ms, and (ii) availability information including an indicator that cluster C is unreachable.

Returning to FIG. 6, at 604, upon receiving the join request, conference controller 102 assigns an identifier (ID) to the communication session, i.e., assigns a communication session ID. Conference controller 102 determines (i) a "best" cluster among candidate clusters A-C to which client3 should connect for the communication session based on policy and the reachability information provided by client3, and (ii) selects a media node within the best cluster to which the client should connect. Conference controller 102 stores identities of the best cluster and the selected media node. In the example of FIG. 6, conference controller 102 determines the best cluster as cluster B based on the reachability information provided by client1. In an example, conference controller 102 determines the best cluster as the candidate cluster associated with a lowest one of the RTTs, a highest one of the available communication bandwidths, or a lowest one of the hop counts. Conference controller 102 selects a media node in the best cluster (e.g., cluster B) in accordance with any number of selection strategies. In the example of FIG. 6, because client3 is the initial client to join the communication session in the best cluster, conference controller 102 may select the media node based on load balancing across the media nodes in the best cluster. The load balancing may use random selection, round-robin selection, or other load balancing strategies. In an example in which another (previous) client has already been connected to a media node in the best cluster for the communication session, a different selection strategy may be used, as will be described below in connection with FIG. 12.

In one load balancing example, conference controller 102 randomly selects a media node in the best cluster. At 606, conference controller 102 queries the randomly selected media node for availability. This query contains the SDP offer from the join request. Based on a local computational load and a remaining capacity to handle the communication session at the randomly selected media node, the media node responds (also at 606) to the query with an indication of either YES (positive availability) or NO (negative availability) if the media node is available or not available to handle the communication session, respectively. If the media node responds with a YES, the media node provides an SDP answer in its response to controller 102, and information in the SDP answer (which includes the IP address, ports, codec information and other contact information for the media node) is passed from the controller to client3 at 608 (discussed below). If the media node responds with a NO, by rejecting the SDP offer, conference controller 102 randomly selects a next media node in the best cluster, repeats the query for availability, and so on, until conference controller 102 finds an available media node in the best cluster and selects that available media node.

Figure 8:
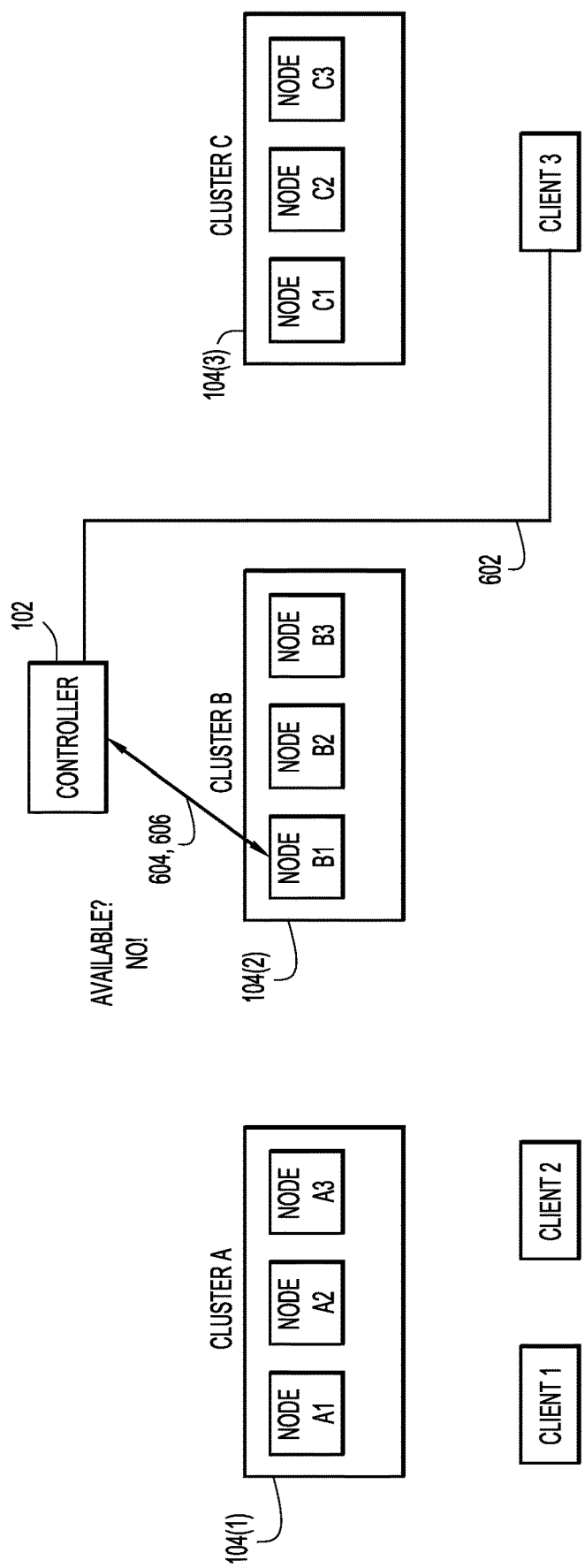
FIG. 8 is an illustration of further operations shown in FIG. 6 in which the conference controller requests availability of a media node for the communication session, and the media node indicates it is not available, according to an example embodiment.
Figure 9:
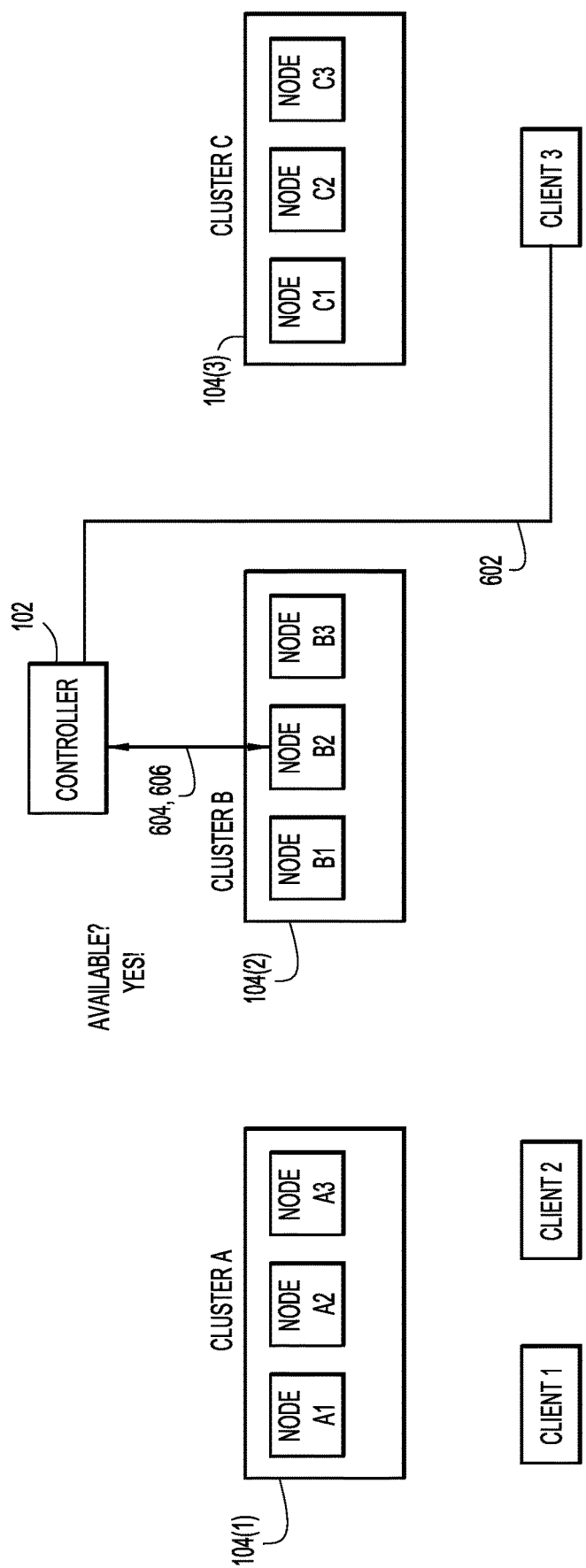
FIG. 9 is an illustration of further operations shown in FIG. 6 in which the conference controller requests availability of another media node for the communication session, and the media node indicates it is available, according to an example embodiment.

With reference to FIG. 8, there an illustration of further operations 604 and 606 in system 100 in which conference controller 102 requests availability of media node B1 in cluster B to handle the communication session initiated at 602, and the media node indicates back to the conference controller that it is not available. With reference to FIG. 9, there an illustration of further repeated operations 604 and 606 in system 100 after media node B1 in cluster B has indicated it is not available (as shown in FIG. 8), in which conference controller 102 requests availability of media node B2 in cluster B to handle the communication session 602, and the media node indicates back to the conference controller that it is available.

Returning again to FIG. 6, at 608, conference controller 102 sends to client3 a response to the join request. The response may take the form of an SDP answer. The response includes the communication session ID, contact information for the selected media node, such as an IP address and a port, and codec capability of the selected media node. Alternatively, or additionally, at 610, the selected media node sends to client3 a message, e.g., an SDP message, including some of the information included in the response to the join request.

Figure 10:
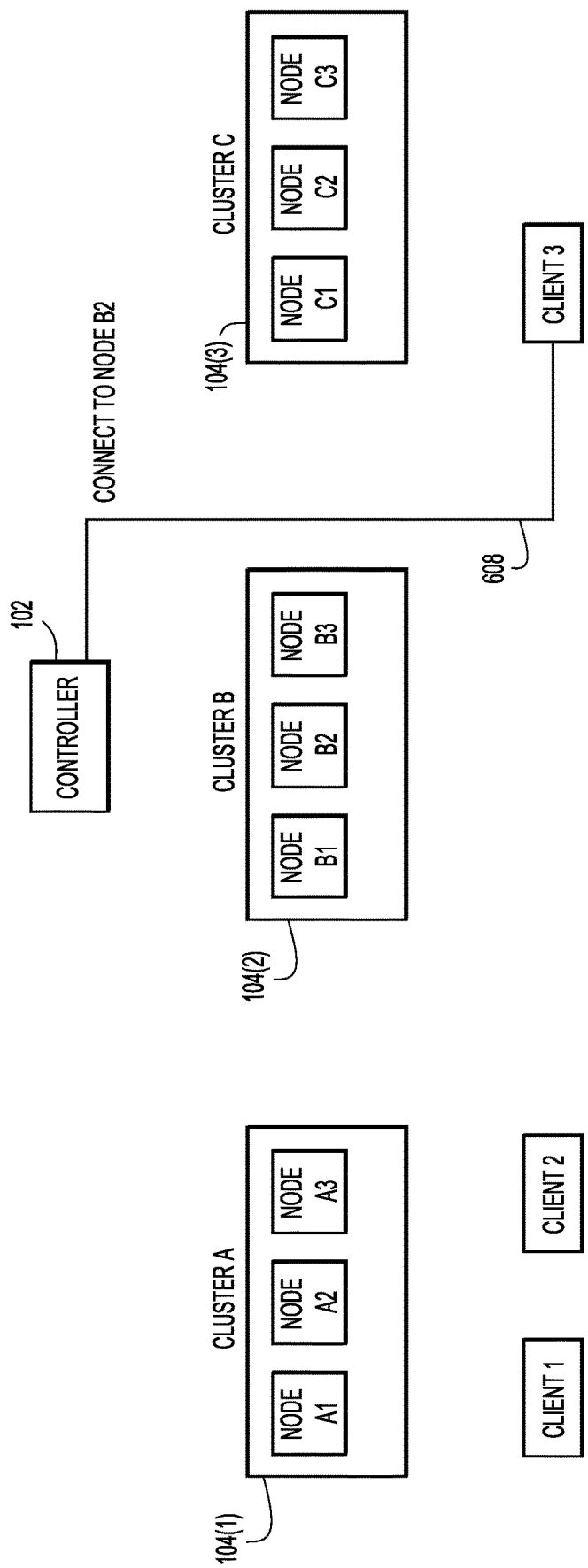
FIG. 10 is an illustration of a further operation shown in FIG. 6 in which the conference controller sends to a client device a response to a join request, according to an example embodiment.

With reference to FIG. 10, there an illustration of an example of operation 608 in system 100 in which conference controller 102 sends to client3 the response to the join request, carrying contact information for media node B2 in cluster B.

Returning again to FIG. 6, at 612, upon receiving the response to the join request sent at 608 and/or the message sent from the selected media node at 610, client3 uses the received information for the selected media node to connect with the selected media node, i.e., to form a media connection with the selected media node. This media connection is usually formed using standard techniques, e.g., Interactive Connectivity Establishment (ICE) negotiation, Datagram Transport Layer Security (DTLS), Secure RTP (SRTP), RTP, and so on.

Figure 11:
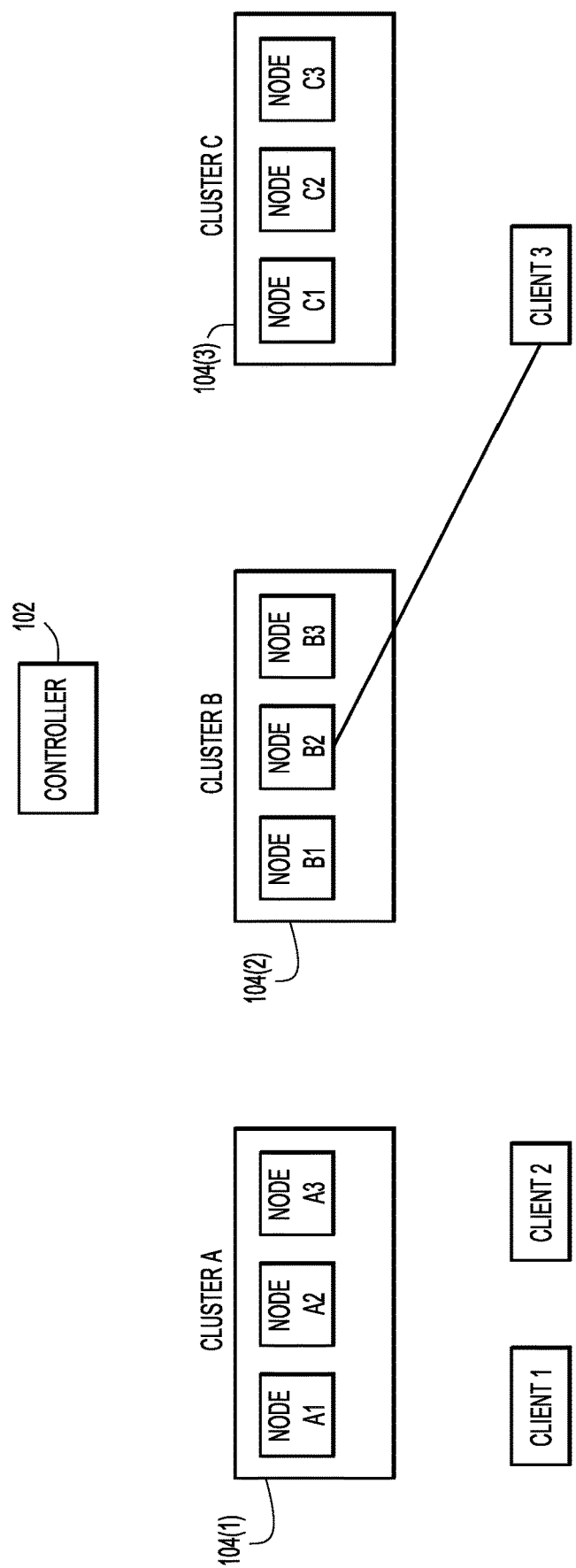
FIG. 11 is an illustration of a further operation shown in FIG. 6 in which the client device connects to a media node, according to an example embodiment.

With reference to FIG. 11, there an illustration of operation 612 in system 100 in which client3 connects to media node B2 in cluster B responsive to response 608 shown in FIG. 10.

Returning again to FIG. 6, at 622-632, client1 (e.g., a second client) joins the communication session. Operations/transactions 622-632 are substantially the same as operations/transactions 602-612, as described below.

At 622, client1 sends to conference controller 102 a join request. The join request includes reachability information from client1 to its candidate clusters A-C, for example.

At 624 and 626, upon receiving the second join request, conference controller 102 associates the join request/client1 to the communication session, and determines (i) a best cluster among candidate clusters A-C to which client1 should connect for the communication session based on policy and the reachability information received from client1, and (ii) selects a media node within the best cluster to which the client should connect. In the example of FIG. 6, conference controller 102 determines the best cluster as cluster A based on the reachability information provided by client1. Because none of the media nodes in cluster A are already connected to a client for the communication session, conference controller 102 selects a media node in cluster A as described above. Conference controller 102 stores identities of the best cluster and the selected media node.

At 628, conference controller 102 sends to client1 a response to the join request, including the communication session ID, contact information for the selected media node in cluster A, such as an IP address and a port, and codec capability of the selected media node. Alternatively and/or additionally, the selected media node sends to client1 a message including some of the information included in the response to the join request.

At 632, upon receiving the response to the join request sent at 628 and/or the message sent from the selected media node at 630, client1 uses the received information for the selected media node to connect with the selected media node, i.e., to form a media connection to the selected media node.

At 640 conference controller 102 sends a message to the selected media node in cluster B connected to client3 to instruct that media node to form a media connection with the selected media node connected to client 1 in cluster A. The message includes contact information for the selected media node in cluster A, and the communication session ID.

At 642 conference controller 102 sends a message to the selected media node in cluster A to instruct that media node to form a media connection with the selected media node in cluster B. The message includes contact information for the selected media node in cluster B, and the communication session ID.

At 644, the selected media nodes in clusters A and B form a media connection with each other. This completes a media connection (i.e., pathway or pipeline) 650 from client1 to client3 along which media packets may flow between the clients. The connected media nodes form a cascade of connected media nodes. The media connections may operate in accordance with RTP, i.e., exchange RTP packets between client1 and client3.

Figure 12:
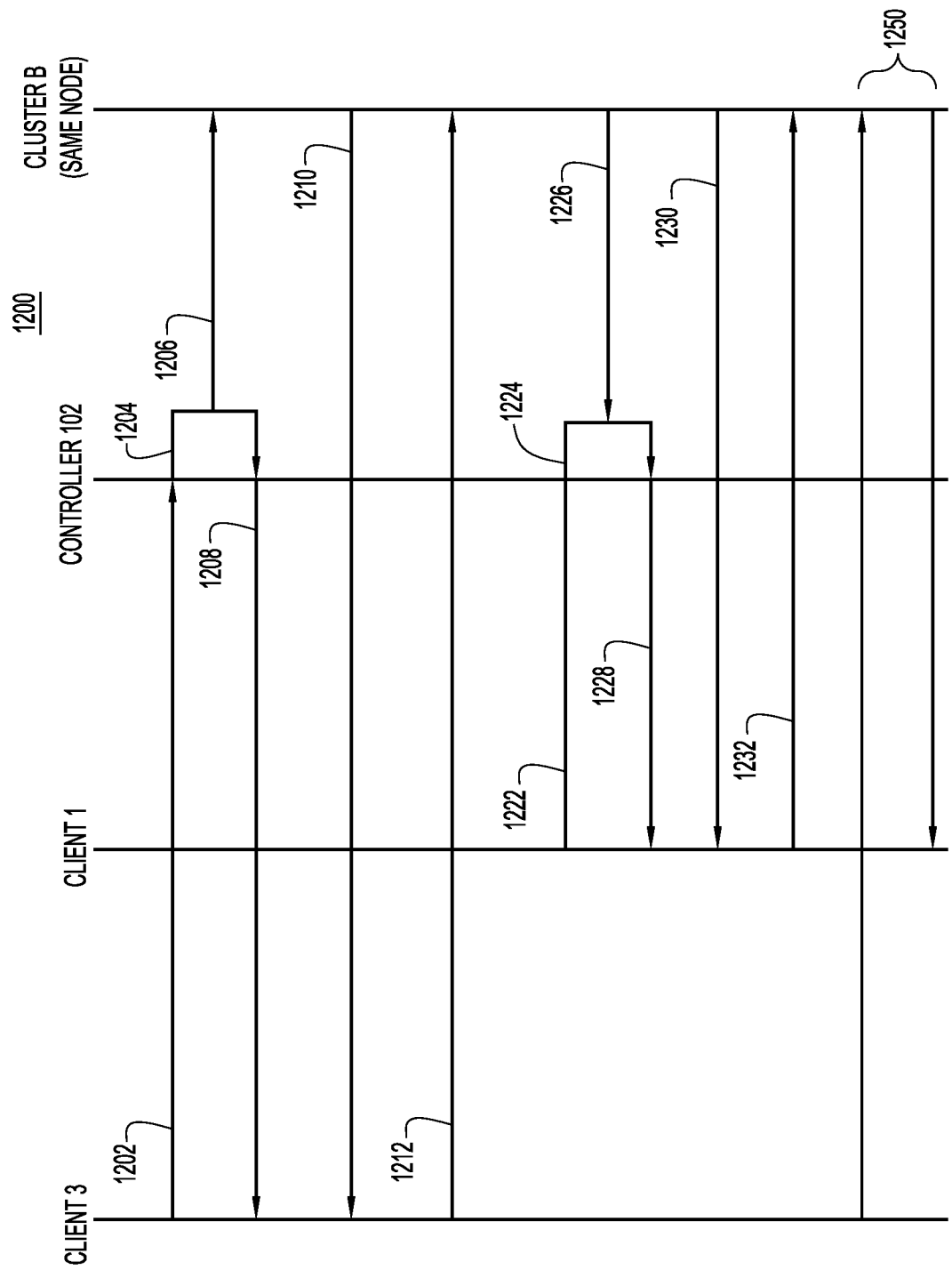
FIG. 12 is a transaction diagram in which client devices establish a communication session with each other via the same cluster and the same media node, according to an example embodiment.

With reference to FIG. 12, there is depicted an example transaction diagram 1200 in which client 3 and client1 establish a communication session with each other via the same cluster and the same media node.

At 1202-1212 client3 establishes and/or joins a communication session. Operations/transactions 1202-1212 are substantially the same as operations/transactions 602-612 described above in connection with FIG. 6. In the example of FIG. 12, client3 connects with a media node selected in best cluster B.

At 1222-1232 client1 joins the communication session that client3 has already/previously joined. In the example of FIG. 12, client1 connects with the same media node as client3 in cluster B (as opposed to a different media node in a different cluster as described in FIG. 6). Operations/transactions 1222-1232 are substantially the same as operations/transactions 622-632 described above, except as described below.

Prior to 1224, client3 has already joined the communication session and is assigned to connect to the media node in cluster B. At 1224, responsive to the join request received from client1, conference controller 102 determines that cluster B is the best cluster for client1 for the communication session based on the reachability information provided by client1. Because client3 and client1 share the same best cluster, and because conference controller 102 has already selected the media node in the best cluster for client3, the conference controller selects the same media node for client1 so that client3 and client1 will be connected to the same media node in the same cluster.

As described above in connection with FIG. 12, for a subsequent client (e.g., client1) joining the same communication session as a previous client (e.g., client3), conference controller 102 can elect, based on policy, to place the subsequent client in the same cluster as the previous/existing client, or, more commonly, utilize the closest cluster in terms of latency and assign the subsequent user to the media node already in use for previous clients joined to the communication session. Consequently, conference controller 102 guarantees that all clients in/joined to the same communication session utilize the same media node if they are in a similar geography and, otherwise, as described in connection with FIG. 6, form cascades of media nodes in difference clusters for clients in different geographies. As described in connection with FIG. 6, the conference controller assigns cascades by requesting that media nodes assigned to clients joined to the communication session connect to each other. This is easily done by having conference controller 102 store, for each communication session, the media nodes and clusters already in use.

Figure 13:
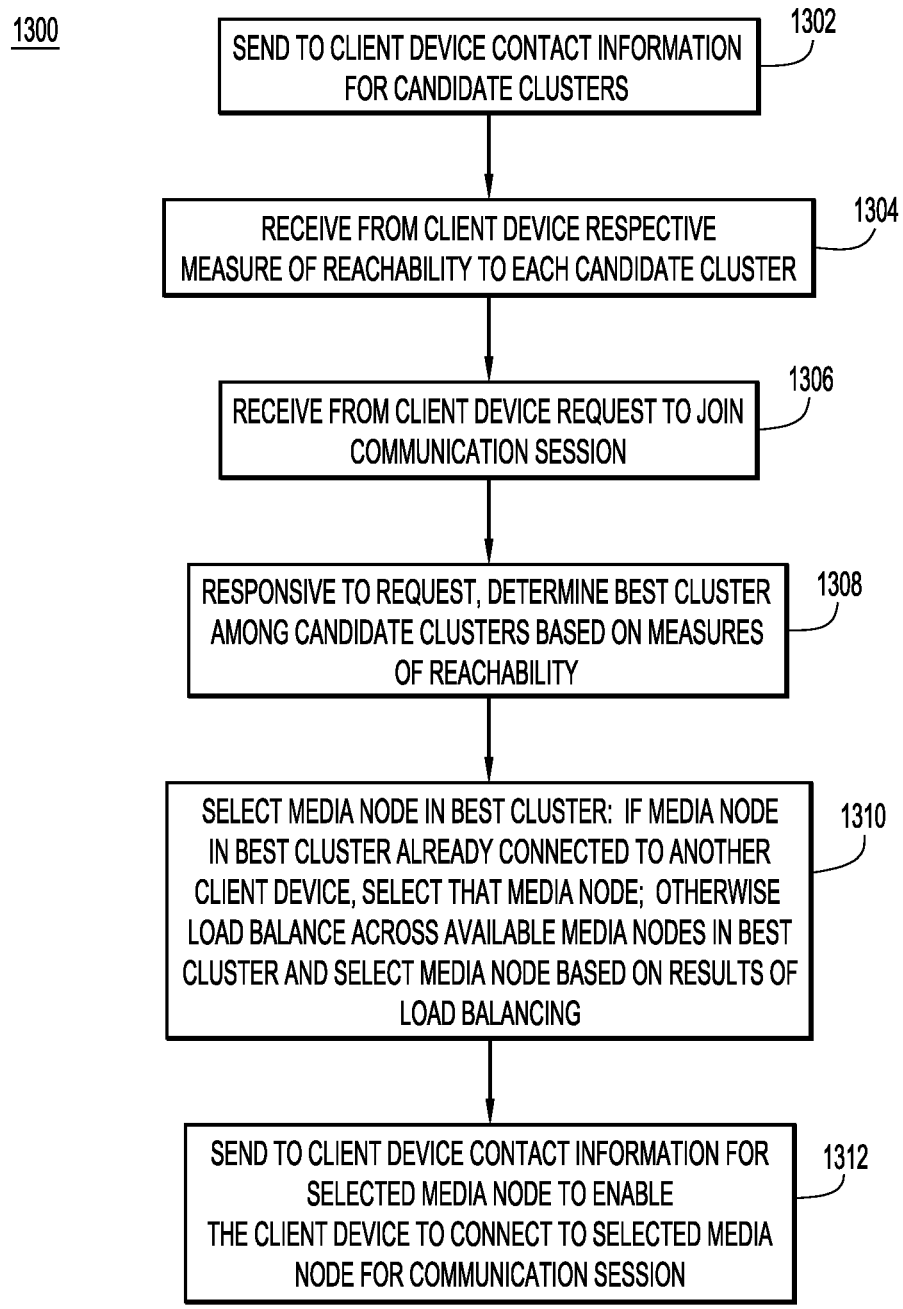
FIG. 13 is a flowchart of a method of connecting a client to a communication session using reachability information derived by the client performed by the conference controller, according to an example embodiment.

With reference to FIG. 13, there is a flowchart of an example method 1300 of connecting a client (e.g., client3) to a communication session using reachability information derived by the client performed by conference controller 102. Method 1300 performs various operations described above.

At 1302, conference controller 102 sends to the client contact information for candidate clusters (e.g., among clusters 104) that are potentially usable by the client for establishing a communication session.

At 1304, conference controller 102 receives from the client a respective measure of reachability to each candidate cluster as determined by the client using the contact information.

At 1306, conference controller 102 receives from the client a request to join a communication session.

At 1308, responsive to the request, conference controller 102 determines a best cluster among the candidate clusters to which the client should connect for the communication session based on the measures of reachability to the candidate clusters.

At 1310, conference controller 102 selects a media node in the best cluster in the following manner:
  a. Conference controller 102 determines whether one of the media nodes in the best cluster is already connected to another client device that previously joined the communication session.
  b. If one of the media nodes in the best cluster is connected to another client device that previously joined the communication session, conference controller 102 selects that media node for the client device from which the join request was received at 1304.
  c. If none of the media nodes in the best cluster are already connected to another client device that previously joined the communication session, conference controller 102 determines available media nodes in the best cluster, performs load balancing across the available media nodes, and selects one of the available media nodes for the client device from which the join request was received at 1304 based on results of the load balancing.

At 1312, conference controller 102 sends to the client contact information for the selected media node to enable the client to connect to the selected media node for the communication session. The client device connects to the selected media node.

As subsequent clients send respective requests to join the communication session, conference controller 102 repeats 1304-1310 to join the clients to the communication session via respective clusters and selected media nodes, and instructs the media nodes to connect with each other to complete media pathways between the joined clients, as described above in connection with FIGS. 6 and 12.

SUMMARY

In summary, embodiments presented herein are directed to a system having (i) a central conference controller which acts as a signaling entity responsible for managing connectivity to communication sessions, (ii) geographically distributed clusters of media nodes which are server components that handle audio and video transport between clients, and (iii) the clients which are software or hardware elements that seek to connect with the system and each other to place calls and join meetings. The system provides large scale cloud conferencing, and supports nearly unlimited scale in terms of clusters/geographies and media nodes per cluster. The conference controller sends to the clients a list of candidate clusters ahead of the clients sending join request, the clients probe the candidate clusters for latency and availability/reachability, and then provide this information to the conference controller at the time of join requests. The conference controller then uses this information, along with policy, to choose media nodes to which the clients can connect. Typically, the conference controller will prefer to connect users to the same media node in the same cluster to avoid cascaded media nodes.

The embodiments are superior to traditional Domain Name System (DNS) load balancing techniques for the following reasons:
  a. In cases where the client cannot reach specific clusters, due to policy or network connectivity (e.g., a cluster is deployed in a private data center for a specific customer), the embodiments can easily factor this into the implementation logic.
  b. The embodiments enable policy-based decision making, combining reachability information with policy based on the identity of the user/client, which DNS approaches cannot do because the DNS approaches are identity-free.
  c. The embodiments provide a way to easily 'stick' users to the same media node; an important property for conferencing. This property is generally not important in typical streaming media applications (which also require large scale distributed geographic clusters of media nodes), and not easily achieved with DNS techniques.
  d. The embodiments enable direct client measurement of connectivity and latency rather than approximate geographic proximity; in addition to latency, clients may measure bandwidth, packet loss and other decision factors.
  e. Because cluster discovery occurs prior to call setup, there is no latency penalty for increased scale of clusters or servers per cluster.

In summary, in one form, a method is provided comprising: at a controller of a conference system including geographically distributed clusters of media nodes, wherein each media node is configured to perform media packet processing operations and to connect with other media nodes and client devices to form media pathways over which media packets are exchanged in communication sessions between the client devices: sending to a client device contact information for candidate clusters that are potentially usable by the client device for establishing a communication session; receiving from the client device a respective measure of reachability to each candidate cluster as determined by the client device using the contact information; receiving from the client device a request to join a communication session; responsive to the request, determining a best cluster among the candidate clusters to which the client should connect for the communication session based on the measures of reachability to the candidate clusters, and selecting a media node in the best cluster; and sending to the client device contact information for the selected media node to enable the client device to connect to the selected media node for the communication session.

In summary, in another form, an apparatus is provided comprising: a network interface unit to communicate with a network; and a processor coupled to the network interface unit and configured to control a conference system including geographically distributed clusters of media nodes, wherein each media node is configured to perform media packet processing operations and to connect with other media nodes and client devices to form media pathways over which media packets are exchanged in communication sessions between the client devices, the processor further configured to: send to a client device contact information for candidate clusters that are potentially usable by the client device for establishing a communication session; receive from the client device a respective measure of reachability to each candidate cluster as determined by the client device using the contact information; receive from the client device a request to join a communication session; responsive to the request, determine a best cluster among the candidate clusters to which the client should connect for the communication session based on the measures of reachability to the candidate clusters, and selecting a media node in the best cluster; and send to the client device contact information for the selected media node to enable the client device to connect to the selected media node for the communication session.

In summary, in yet another form, a non-transitory computer readable medium is provided. The computer readable medium is encoded with instruction that, when executed by a processor configured to control a conference system including geographically distributed clusters of media nodes, wherein each media node is configured to perform media packet processing operations and to connect with other media nodes and client devices to form media pathways over which media packets are exchanged in communication sessions between the client devices, cause the processor to perform: sending to a client device contact information for candidate clusters that are potentially usable by the client device for establishing a communication session; receiving from the client device a respective measure of reachability to each candidate cluster as determined by the client device using the contact information; receiving from the client device a request to join a communication session; responsive to the request, determining a best cluster among the candidate clusters to which the client should connect for the communication session based on the measures of reachability to the candidate clusters, and selecting a media node in the best cluster; and sending to the client device contact information for the selected media node to enable the client device to connect to the selected media node for the communication session.

The above description is intended by way of example only. Various modifications and structural changes may be made therein without departing from the scope of the concepts described herein and within the scope and range of equivalents of the claims.

What is claimed is:

1. A method comprising:
at a controller of a conference system including geographically distributed clusters of media nodes, wherein each media node is configured to perform media packet processing operations and to connect with other media nodes and client devices to form media pathways over which media packets are exchanged in communication sessions between the client devices:
sending, to a first client device, contact information for candidate clusters that are potentially usable by the first client device for establishing a communication session;
receiving from the first client device a respective measure of reachability to each candidate cluster as determined by the first client device using the contact information;
receiving from the first client device a request to join the communication session;
responsive to the request, assigning a session identifier to the communication session, determining a best cluster among the candidate clusters to which the first client device should connect for the communication session based on the respective measures of reachability to the candidate clusters, and selecting a media node among media nodes in the best cluster;
sending to the first client device the session identifier and information for the media node to enable the first client device to connect to the media node for the communication session;
upon receiving from a second client device a second join request to join the communication session, selecting from the clusters of media nodes a second media node for the second client device, configuring the second client device with the session identifier and to connect to the second media node for the communication session;
configuring the media node and the second media node with the session identifier and to connect with each other to form a media pathway from the first client device to the second client device through which media packets flow during the communication session;
after the determining the best cluster but before the selecting the media node in the best cluster, determining whether, as a result of the second client device having previously joined the communication session, the second media node is connected to the second client device and is in the best cluster; and
if the second media node is connected to the second client device and is in the best cluster, selecting the second media node as the media node for the first client device.

2. The method of claim 1, wherein:
the receiving the respective measure of reachability to each candidate cluster includes receiving a respective round-trip-time (RTT) for a round-trip message exchange between the first client device and the candidate cluster; and
the determining the best cluster includes determining as the best cluster the candidate cluster associated with a lowest one of the RTTs.

3. The method of claim 1, further comprising, at the controller:
load balancing across the media nodes in the best cluster, wherein the selecting includes selecting the media node based on results of the load balancing across the media nodes.

4. The method of claim 3, wherein the load balancing includes:
querying at least some of the media nodes in the best cluster for respective availabilities to handle the communication session, receiving from each queried media node an indication of either a positive availability or a negative availability to handle the communication session as determined by that media node responsive to the querying, wherein the selecting includes selecting the media node as one of the queried media nodes from which an indication of positive availability is received.

5. The method of claim 1, further comprising, at the controller:
if the second media node is connected to the second client device but is not in the best cluster:
load balancing across the media nodes in the best cluster; and
selecting the media node for the first client device from among the media nodes in the best cluster based on results of the load balancing.

6. The method of claim 1, further comprising, at the controller:
determining whether the second media node is not in the best cluster; and
if the second media node is not in the best cluster, sending instructions to the media node and the second media node to cause the media node and the second media node to connect with each other to form a cascade of media nodes that provides the media pathway between the first client device and the second client device.

7. The method of claim 1, wherein:
the receiving the respective measure of reachability to each candidate cluster includes receiving a respective bandwidth available on a communication link between the first client device and the candidate cluster; and
the determining the best cluster includes determining as the best cluster the candidate cluster having a highest bandwidth available among the respective bandwidths.

8. The method of claim 1, wherein the sending to the first client device the contact information for the candidate clusters includes sending to the first client device, for each candidate cluster, a list of Internet Protocol (IP) addresses and ports, and one or more communication protocol transport types to be used by the first client device to contact one or more media nodes in the candidate cluster.

9. The method of claim 1, further comprising, at the controller, receiving indications of whether certain media nodes in the candidate clusters are unavailable to the first client device.

10. The method of claim 1, wherein the receiving from the first client device the respective measure of reachability to each candidate cluster includes receiving the respective measure of reachability to each candidate cluster combined with the request to join the communication session.

11. The method of claim 1, wherein the receiving from the first client device the respective measure of reachability includes receiving the respective measure of reachability for each candidate cluster prior to the request to join the communication session.

12. The method of claim 1, further comprising, at the first client device:
receiving the contact information from the controller and connecting to the media node selected in the best cluster for the communication session based on the contact information; and
after connecting to the media node, sending media packets to the communication session and receiving packets from the communication session via the media node.

13. The method of claim 1, further comprising, at the first client device:
- receiving the contact information for the candidate clusters, wherein the contact information for the candidate clusters includes contact information for one or more media nodes in each candidate cluster;
- exchanging messages with at least one of the one or more media nodes in each candidate cluster; and
- generating the respective measure of reachability to each candidate cluster based on the exchanging the messages with the candidate cluster.

14. An apparatus comprising:
- a network interface unit to communicate with a network; and
- a processor coupled to the network interface unit and configured to control a conference system including geographically distributed clusters of media nodes, wherein each media node is configured to perform media packet processing operations and to connect with other media nodes and client devices to form media pathways over which media packets are exchanged in communication sessions between the client devices, the processor further configured to:
  - send, to a first client device, contact information for candidate clusters that are potentially usable by the first client device for establishing a communication session;
  - receive from the first client device a respective measure of reachability to each candidate cluster as determined by the first client device using the contact information;
  - receive from the first client device a request to join the communication session;
  - responsive to the request, assign a session identifier to the communication session, determine a best cluster among the candidate clusters to which the first client device should connect for the communication session based on the respective measures of reachability to the candidate clusters, and selecting a media node among media nodes in the best cluster;
  - send to the first client device the session identifier and contact information for the media node to enable the first client device to connect to the media node for the communication session;
  - upon receiving from a second client device a second join request to join the communication session, select from the clusters of media nodes a second media node for the second client device, and configure the second client device with the session identifier and to connect to the second media node for the communication session;
  - configure the media node and the second media node with the session identifier and to connect with each other to form a media pathway from the first client device to the second client device through which media packets flow during the communication session;
  - after the best cluster is determined but before the media node in the best cluster is selected, determine whether, as a result of the second client device having previously joined the communication session, the second media node is connected to the second client device and is in the best cluster; and
  - if the second media node is connected to the second client device and is in the best cluster, select the second media node as the media node for the first client device.

15. The apparatus of claim 14, wherein the processor is configured to:
- receive the respective measure of reachability to each candidate cluster by receiving a respective round-trip-time (RTT) for a round-trip message exchange between the first client device and the candidate cluster; and
- determine the best cluster by determining as the best cluster the candidate cluster associated with a lowest one of the RTTs.

16. The apparatus of claim 14, wherein the processor is further configured to:
- load balance across the media nodes in the best cluster, wherein the processor is configured to select by selecting the media node based on results of the load balance.

17. A non-transitory computer readable medium encoded with instruction that, when executed by a processor configured to control a conference system including geographically distributed clusters of media nodes, wherein each media node is configured to perform media packet processing operations and to connect with other media nodes and client devices to form media pathways over which media packets are exchanged in communication sessions between the client devices, cause the processor to perform:
- sending, to a first client device, contact information for candidate clusters that are potentially usable by the first client device for establishing a communication session;
- receiving from the first client device a respective measure of reachability to each candidate cluster as determined by the first client device using the contact information;
- receiving from the first client device a request to join the communication session;
- responsive to the request, assigning a session identifier to the communication session, determining a best cluster among the candidate clusters to which the first client device should connect for the communication session based on the respective measures of reachability to the candidate clusters, and selecting a media node among media nodes in the best cluster;
- sending to the first client device the session identifier and information for the media node to enable the first client device to connect to the media node for the communication session;
- upon receiving from a second client device a second join request to join the communication session, selecting from the clusters of media nodes a second media node for the second client device, configuring the second client device with the session identifier and to connect to the second media node for the communication session;
- configuring the media node and the second media node with the session identifier and to connect with each other to form a media pathway from the first client device to the second client device through which media packets flow during the communication session;
- after the determining the best cluster but before the selecting the media node in the best cluster, determining whether, as a result of the second client device having previously joined the communication session, the second media node is connected to the second client device and is in the best cluster; and
- if the second media node is connected to the second client device and is in the best cluster, selecting the second media node as the media node for the first client device.

18. The non-transitory computer readable medium of claim 17, wherein:
- the instructions to cause the processor to perform the receiving the respective measure of reachability to each candidate cluster include instructions to cause the processor to perform receiving a respective round-trip-time (RTT) for a round-trip message exchange between the first client device and the candidate cluster; and the instructions to cause the processor to perform the determining the best cluster include instructions to cause the processor to perform determining as the best cluster the candidate cluster associated with a lowest one of the RTTs.

19. The non-transitory computer readable medium of claim 17, further comprising instructions to cause the processor to perform:

load balancing across the media nodes in the best cluster, wherein the instructions to cause the processor to perform the selecting include instructions to cause the processor to perform selecting the media node based on results of the load balancing.

* * * * *